(12) United States Patent
Mestha et al.

(10) Patent No.: US 8,049,924 B2
(45) Date of Patent: Nov. 1, 2011

(54) METHODS AND APPARATUS FOR COLOR CONTROL OF COATED IMAGES ON A PRINTED MEDIA

(75) Inventors: Lalit Keshav Mestha, Fairport, NY (US); Peter Stanley Fisher, Pasadena, CA (US)

(73) Assignee: Xerox Corporation, Norwalk, OH (US)

( * ) Notice: Subject to any disclaimer, the term of this patent is extended or adjusted under 35 U.S.C. 154(b) by 547 days.

(21) Appl. No.: 12/274,846

(22) Filed: Nov. 20, 2008

(65) Prior Publication Data

US 2009/0296152 A1    Dec. 3, 2009

Related U.S. Application Data

(60) Provisional application No. 61/056,327, filed on May 27, 2008.

(51) Int. Cl.
 *H04N 1/60* (2006.01)
(52) U.S. Cl. ......... 358/1.9; 358/504; 358/518; 358/520; 358/523
(58) Field of Classification Search .................. 358/1.9, 358/504, 518, 520, 523; 382/167
See application file for complete search history.

(56) References Cited

U.S. PATENT DOCUMENTS

| | | | | |
|---|---|---|---|---|
| 7,324,240 B2 * | 1/2008 | Ng | ................................. | 358/1.9 |
| 7,924,460 B2 * | 4/2011 | Ng | ................................. | 358/1.9 |
| 2009/0219554 A1 * | 9/2009 | Freyer et al. | ..................... | 358/1.9 |
| 2009/0316165 A1 * | 12/2009 | Mestha et al. | .................. | 358/1.9 |
| 2011/0032546 A1 * | 2/2011 | Dalal et al. | ...................... | 358/1.9 |

OTHER PUBLICATIONS

"Adobe Systems' Implementation of Black Point Compensation," copyright 2006, Adobe Systems Incorporated, 12 pages.
International Color Consortium Specification ICC.1:2004-10-Profile version 4.2.0.0.
U.S. Appl. No. 12/143,040, filed Jun. 20, 2008, Mestha et al.

* cited by examiner

*Primary Examiner* — Scott A Rogers
(74) *Attorney, Agent, or Firm* — Fay Sharpe LLP (57) ABSTRACT

This disclosure relates to the color management of image output devices. Specifically, this disclosure provides methods, apparatus and systems to generate a destination printer profile for coated images. According to one exemplary method, the destination printer profile is generated by printing a plurality of color patches which are then coated, measuring the color attributes associated with the coated color patches, and modifying a destination printer profile to compensate for differences between the printed and coated color patches, relative to a respective reference color.

24 Claims, 5 Drawing Sheets

FIG. 5

METHODS AND APPARATUS FOR COLOR CONTROL OF COATED IMAGES ON A PRINTED MEDIA

This application claims the priority benefit of U.S. provisional patent application Ser. No. 61/056,327, filed May 27, 2008, the disclosure of which is totally incorporated herein by reference.

BACKGROUND

Presently, image output devices, such as printers, multi-function media devices, xerographic machines, and other devices can print color images on media, such as sheets, paper, substrates, transparencies, plastic, cardboard, or other media. Whether an image is printed one time on one device or multiple times on multiple devices, over a short or extended period of time, color consistency is both needed and expected. For example, a designer may design an image that requires specific colors, such as colors that must match exact colors of a company's logo or colors that must match industry standard colors. The designer requires consistency and accuracy of the colors in the image each time the image is printed, even when the image is printed at different times and/or printed on different printing devices. Such color consistency can be critical because it can determine the difference between success and failure in meeting customer requirements.

After an image is printed, a clear coat finish can be applied to the printed image to highlight certain areas of the image to protect the printed image or to give the image a shiny or vibrant color. For example, an ultraviolet, aqueous, or laminate clear coat finish can be applied to printed images. These clear coat finishes can be applied to an entire page to enhance and protect the page or can be applied to selected sections of the page to draw attention to the sections.

Unfortunately, such clear coat finishes can cause a perceived color of the printed image to shift away from the desired color of the image. This color shift becomes a problem when color consistency between images is required and when images must include specific colors. For example, when printed image colors are clear coated, the clear coat finish can cause the perceived color of the finished product to be different from the desired color. Such a difference can result in a failure to meet designer and customer color requirements. Thus, there is a need for methods and apparatus to control the color of coated images on media.

BRIEF DESCRIPTION

In one embodiment of this disclosure, a method is disclosed of generating a destination printer profile for coated images. The disclosed method comprises A) receiving one or more target colors represented in a device independent color space; B) accessing an initial printer profile for the target colors printed with a coating, the initial printer profile transforming the device independent color space representations of the target colors to respective device specific recipes of colorants associated with printing and coating the target colors; C) printing one or more color patches using the initial printer profile to generate device specific recipes of colorants to print the color patches; D) coating the one or more color patches; E) measuring color attributes associated with the printed and coated color patches; F) determining an error associated with the printed and coated one or more color patches relative to the respective one or more target colors represented in a device independent color space; and G) modifying the initial printer profile for the target colors as a function of the error to generate a destination printer profile for printing the one or more target colors with a coating.

In another embodiment of this disclosure, a computer program product is disclosed which comprises a computer-usable data carrier storing instructions that, when executed by a computer, cause the computer to perform a method comprising A) receiving one or more target colors represented in a device independent color space; B) accessing an initial printer profile for the target colors rendered with a coating, the initial printer profile transforming the device independent color space representation of the target colors to respective device specific color recipes of colorants associated with printing and coating of the target colors; C) printing one or more color patches using the initial printer profile to generate recipes of colorants to print the color patches; D) coating the one or more color patches; E) measuring color attributes associated with the printed color patches; F) determining an error associated with the coated one or more color patches relative to the respective one or more target colors represented in a device independent color space; and G) modifying the initial printer profile for the target colors as a function of the error to generate a destination printer profile for printing the one or more target colors with a coating.

In still another embodiment of this disclosure, a method of generating a destination printer profile for coated images is disclosed. The method comprises A) receiving one or more target colors represented in a device independent color space; B) accessing an initial printer profile for the target colors printed with a coating, the initial printer profile transforming the device independent color space representation of the target colors to respective device specific recipes of colorants associated with printing and coating the target colors; C) accessing a printer model which associates a plurality of device specific recipes of coated colorants with respective device independent color space values; D) generating device independent color space representations for the one or more target colors coated using the initial printer profile and the printer model; E) determining an error associated with the generated device independent color space representations of step D) relative to the respective one or more target colors of step A) represented in a device independent color space; and F) modifying the initial printer profile for the target colors as a function of the error to generate the destination printer profile for printing the one or more target colors with a coating.

In yet another aspect of this disclosure, a computer program product is disclosed which comprises a computer-usable data carrier storing instructions that, when executed by a computer, cause the computer to perform a method comprising A) receiving one or more target colors represented in a device independent color space; B) accessing an initial printer profile for the target colors printed with a coating, the initial printer profile transforming the device independent color space representation of the target colors to respective device specific recipes of colorants associated with printing and coating the target colors; C) accessing a printer model which associates a plurality of device specific recipes of coated colorants with respective device independent color space values; D) generating device independent color space representations for the one or more target colors coated using the initial printer profile and the printer model; E) determining an error associated with the generated device independent color space representations of step D) relative to the respective one or more target colors of step A) represented in a device independent color space; and F) modifying the initial printer profile for the target colors as a function of the error to generate the destination printer profile for printing the one or more target colors with a coating.

INCORPORATION BY REFERENCE

"ADOBE SYSTEMS' IMPLEMENTATION OF BLACK POINT COMPENSATION"; copyright 2006, Adobe Systems Incorporated; and U.S. patent application Ser. No. 12/143,040, entitled "APPARATUS AND METHOD FOR COLOR CONTROL OF CLEAR COATED IMAGES ON MEDIA," by Lalit K. Mestha and Peter S. Fisher, filed on Jun. 20, 2008 are totally incorporated herein by reference.

DETAILED DESCRIPTION

Ultra-violet coating is a glossy coating (clear liquid) applied over printed age and dried instantly by exposure to UV radiation. Apart from prints, UV coating can be also be applied to eyeglasses, automotive windows etc.

As discussed in the background section, a printed page with a coating such as UV (ultra violet) coating can be very shiny and vibrant in appearance, hence can draw attention of the viewer to the image. The coating causes color shift which can be significant when the UV coating is applied to the printed page. The color shift also depends on the media and the depth of coating. In addition, the coating can also discolor white paper.

This disclosure provides methods, apparatus and systems to control the color appearance of a coated image as marked on a substrate. Specifically, this disclosure provides color control of coated images on a printed media. However, it is to be understood the methods, apparatus and systems disclosed may be applied to the coating of other substrates, for example, glass, metal, etc. Moreover, the exemplary embodiments described herein specifically address the UV coating of a printed image on a media substrate, such as paper, however, it is to be understood other coating material can be used and is within the scope of this disclosure. Other examples of coating material include gloss and other aqueous clear coatings.

This disclosure and the exemplary embodiments described, provide consistency in images by using advanced profiles that can be used to do color management functions so that the color balance and image quality attributes on a single or multiple engine print environment are maintained to a desired quality level. Two approaches are used to construct the multi-dimensional profile LUTs (Look-up Tables) associated with the advanced profiles; (1) iterating on a printer model and (2) iterating on a printer. Both of these methods require the measurement of printed patches after finishing the patches with a clear coating.

The first method involves building an accurate printer model of the printing system with the coated output and then inverting the model, applying proper GCR (Gray Component Replacement) and mapping out-of-gamut colors to the coated gamut.

The second method involves iterating on the printer at the LUT nodes by printing and measuring patches and applying proper gamut mapping techniques to the coated gamut. Ultimately, accurate profiling technology is used to create high quality images on the coated finish and match the finished output images to the proofing system or, in the case of multiple marking engines, to the finished output of another marking engine.

Applied gloss, or clear coating has a substantive effect on the color rendition and color gamut of the printed outcome. For example, in the case of color rendition, a given CMYK (Cyan, Magenta, Yellow, Black) formula will appear to be a different color when glossy relative to non-glossy.

According to another aspect of this disclosure, gamut mapping of out-of-gamut colors to a coated gamut is performed, as opposed to mapping colors to a normal uncoated gamut (i.e., use of the end-to-end printer gamut with UV Coated measurements). Black point compensation, as described in Adobe Systems' Implementation of Black Point Compensation, may also be applied to coated gamut to retain shadow details in the image. All UV Coatings today contain optical brighteners which in conjunction with the alkalines in pigments can cause certain colors to bleach to a lighter shade. The black point compensation requires proper mapping of the source L* values to the destination L* using some type of mapping curve which is determined using an updated printer model or by directly measuring dark colors.

The use of sensor measurements from the output of a UV Coater determines a multi-dimensional profile LUT. Thus, disclosed methods, apparatus and systems prevent unpredictable color change after coating an image.

In other embodiments, particularly important in the packaging industry, a Direct Marking Module (DMM) is often used pre-fuser to coat white, and then image color images on top of the white. Using a UV curable white gel, the DMM is positioned between the feeder and the print engine prints and cures a contone white image.

Figure 1:
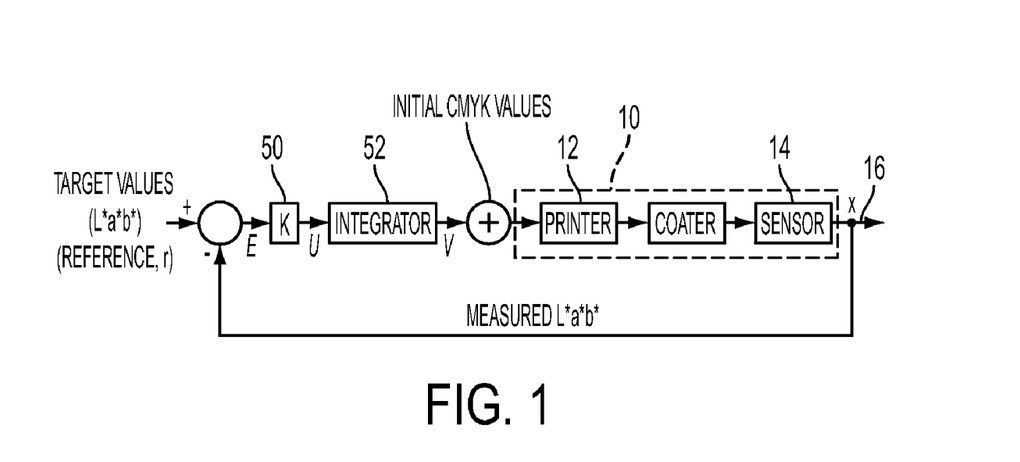
FIG. 1 is a block diagram of a printing apparatus according to an exemplary embodiment of this disclosure.

With reference to FIG. 1, depicted is a block diagram representation of a conventional system model for a pixel element illustrating how to build a stable control loop for that pixel with a minimal number of iterations. The image marking device 10 specified in this system diagram consists of an ink marking device 12, a coater 13 and a color-sensing device 14, although this embodiment is not restricted to ink marking devices alone and any image reproducing/displaying system such as printers, monitors or other imaging devices are intentionally included. In this application, the color-sensing device 14 is a spectrophotometer. The spectrophotometer provides the image marking device output "x" 16 after capturing spectral information on the colors detected. The spectral information is a signal representative of the printed colors of the image and preferably comprises L*a*b* values, XYZ, Luv, etc., values depending on the desired color descriptions. For this description, only L*a*b* coordinate space values are used for describing color.

The image path in a four color CMYK printed system contains a GCR/UCR processing black for removing a K component from the CMY values of the pixel to provide a means to add a separate K input externally.

By assuming the system to be linear at nominal CMY values, the system 10 can be approximated by the following discrete equation. If k is the iteration number, then the open loop system equation can be written in terms of the Jacobian—the first derivative between output and the input, which is given by:

$$x(k+1) = BV(k) + x_o \quad (1)$$

Where, $$x = \begin{bmatrix} L^* \\ a^* \\ b^* \end{bmatrix}, V = \begin{bmatrix} \partial C \\ \partial M \\ \partial Y \end{bmatrix}, B = \begin{bmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{bmatrix}$$

$$x_o = \begin{bmatrix} L^* \\ a^* \\ b^* \end{bmatrix}$$

values for nominal CMY.

V then represents a vector containing small deviations in C, M, Y values from the nominal C, M, Y values. B is a vector representing the gradient of change from the output signals $\chi$ relative to the input signals about the selected nominal values from predetermined sensitivity functions. Signal $\chi$ represents the state variable vector of the pixel element for the open loop system 10. $\chi_o$ is the initial value of the state variable vector. Vector V is the actuator of the open loop system used for varying the state vector $\chi$.

If the control loop is closed for the system 10 with a multivariable gain k 50 and an integrator 52, then the closed loop state-space model can be derived as follows:

$$V(k) = V(k-1) + u(k) \quad (2)$$

Input to the integrator is given by $u(k) = KE(k)$.

In Equation (2), K is the gain matrix, and E is the error vector between measured L*, a*, b* values and the aim values. If the B matrix is invertible, then using the open loop system equation, the following closed loop state-space model can be obtained.

$$\chi(k+1) = A\chi(k) + Bu(k); u(k) = KE(k) \quad (3)$$

In Equation 3 above, the A matrix is given by: A=diag [1 1 1], and u is the actuator vector.

For this type of formulation, the actuator vector u in Equation (3) is different from the actuator vector V used in Equation (1). From Equation (2), the actuator vector u is related to the actuator vector V. Equation (1) is the open loop state-space model and Equation (3) is the closed loop state-space model.

If control of multiple pixel elements is required, which is generally the case in most of the printer control problems, then x and u vectors can be augmented with corresponding state and actuator values of other pixel elements. The gain matrix K is also augmented. The augmented gain matrix K, used for controlling all pixels, becomes block diagonal.

Figure 2:
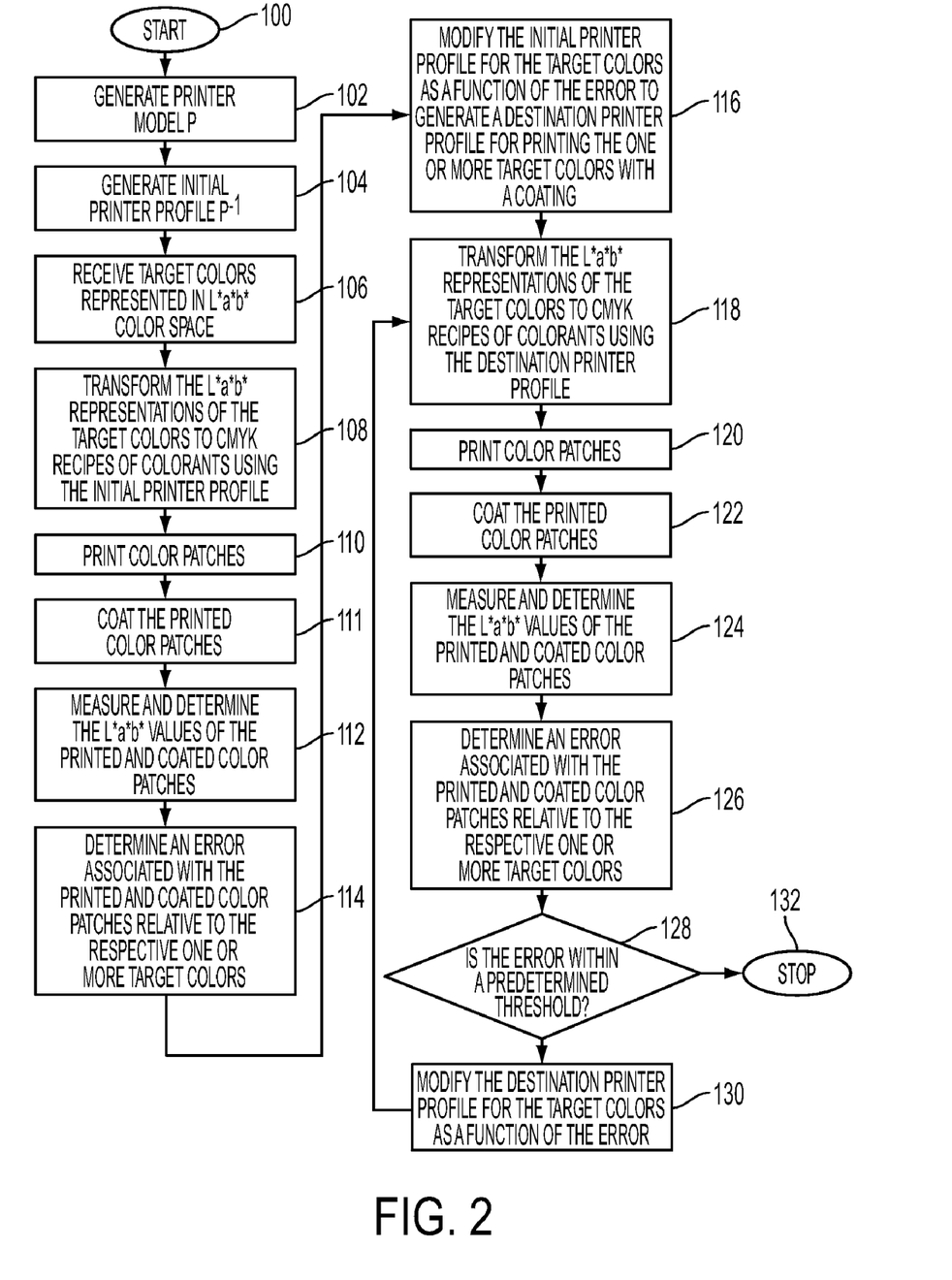
FIG. 2 is a flow chart of another exemplary method of generating a destination printer profile for coated images according to this disclosure, wherein the destination printer profile is iteratively calculated by printing patches and measuring the color attributes of the printed patches.
Figure 3:
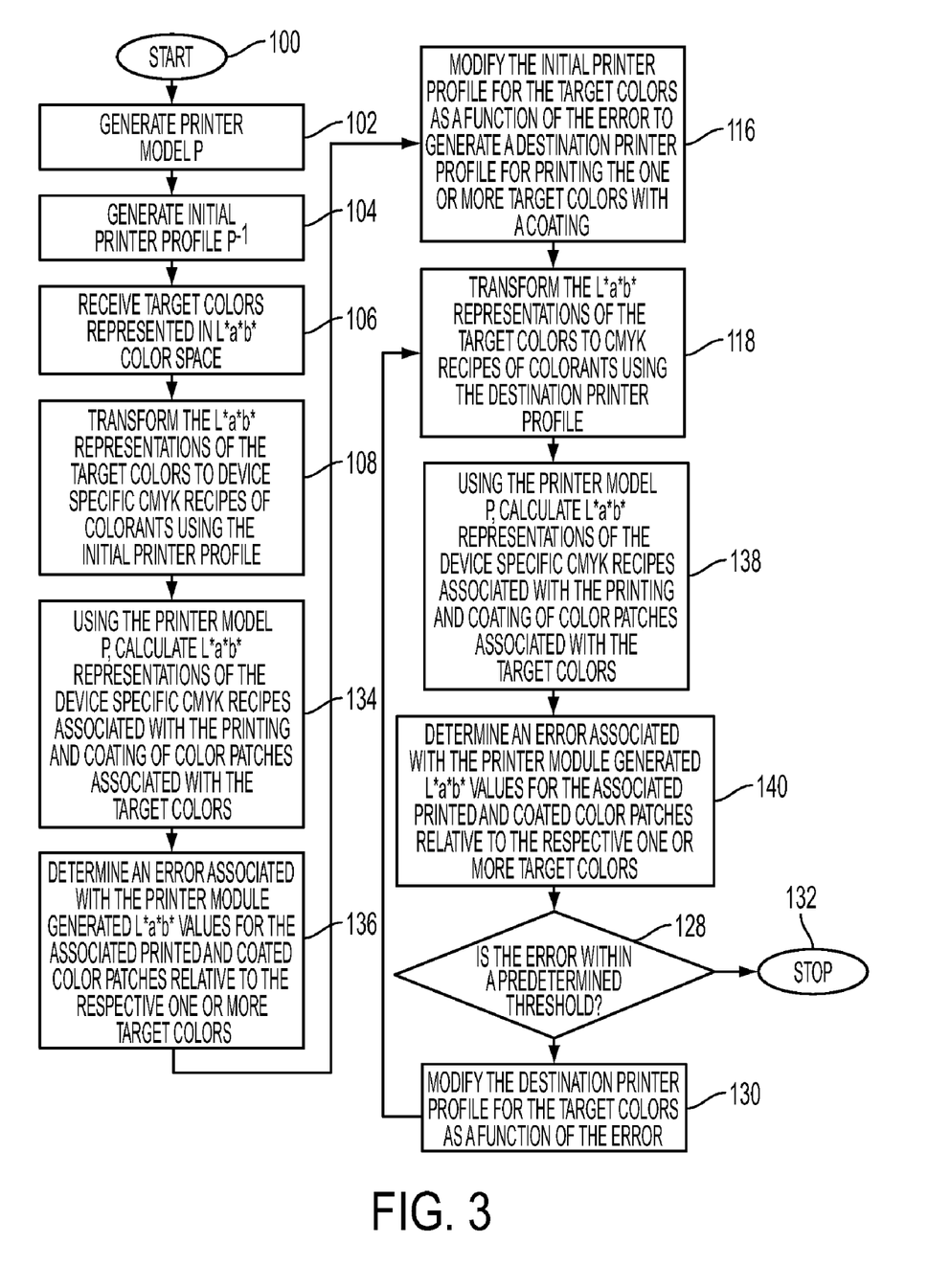
FIG. 3 is a flow chart of another exemplary method of generating a destination printer profile for coated images according to this disclosure, wherein the destination printer profile is iteratively calculated using a printer model.

With reference to FIG. 2, illustrated is a flow chart of another exemplary method of generating a destination printer profile for coated images. According to this method, the destination printer profile is iteratively calculated by printing patches and measuring the color attributes of the printed patches. In contrast, FIG. 3 illustrates a flow chart of another exemplary method of generating a destination printer profile for coated images. According to the method of FIG. 3, the destination printer profile is iteratively calculated using a printer model, not printing patches according to the method of FIG. 2.

The iterative method of generating a destination printer profile according to FIG. 2 operates as follows Initially, the process starts at block 100.

Next, the process generates a printer model P at block 102.

Next, the process generates an initial printer profile $P^{-1}$ at block 104.

Next, the process receives target colors represented in L*a*b* color space at block 106, which is representative of a device independent color space.

Next, at block 108, the process transforms the L*a*b* representations of the target colors, received in block 106, to CMYK recipes of colorants using the initial printer profile generated in block 104.

Next, at block 110, the printer prints color patches using the CMYK recipes of block 108.

Next, at block 111, the printed color patches are coated, for example with a UV coating material.

Next, at block 112, the printed and coated patches are measured with a color sensing device to determine the L*a*b* values associated with the printed and coated color patches.

Next, at block 114, an error signal is generated which represents the difference in color of the printed and coated color patches, relative to the respective target colors received in block 106. Specifically, the difference in L*a*b* values between the printed and coated color patches relative to the L*a*b* values received in block 106 is calculated and represents the error signal.

Next, at block 116, the initial printer profile values for the target colors are modified as a function of the error signal calculated to generate a destination printer profile for printing the target colors with a coating.

Next, at block 118, the process transforms the L*a*b* representations of the target colors to CMYK recipes of colorants using the destination printer profile generate in block 116.

Next, at block 120 and 122, the color patches are printed and coated, respectively.

Next, at block 124, the printed and coated color patches are measured with the color sensing device to generate L*a*b* color space representations.

Next, at block 126, an error signal is calculated which represents the relative color difference, i.e. L*a*b*, of the printed and coated color patches relative to the respective one or more target colors received in block 106.

Next, at block 128, the process determines whether the error calculated in block 126 is within a predetermined threshold or limit.

If the error is within predefined limits, the process stops at block 132.

Otherwise, at block 130, the process modifies the destination printer profile for the target colors as a function of the error.

The, process blocks 118, 120, 122, 124, 126 and 128 are repeated.

Process blocks 130, 118, 120, 122, 124, 126 and 128 are iteratively performed until the error of block 128 is within the predefined limits, after which time the process stops at block 132.

With reference to FIG. 3, which illustrates an iterative printer model method of generating the destination printer profile, it is to be understood process blocks 100, 102, 104, 106, 108, 116, 118, 128, 130 and 132 operate as described with reference to FIG. 2.

However, now a block 134 uses the printer model P to calculate L*a*b* representations of the device specific CMYK recipes associated with the printing and coating of the color patches.

After completion of block 134, process block 136 determines the error associated with the printer model generated L*a*b* values of block 134, relative to the L*a*b* values associated with the target colors received in block 106.

As previously described with reference to FIG. 2, the method of FIG. 3 is an iterative process, where block 138 uses the printer model P to calculate L*a*b* representations of the device specific CMYK recipes generated in block 118, and block 140 calculates an error based on the printer model generated L*a*b* values.

Figure 4:
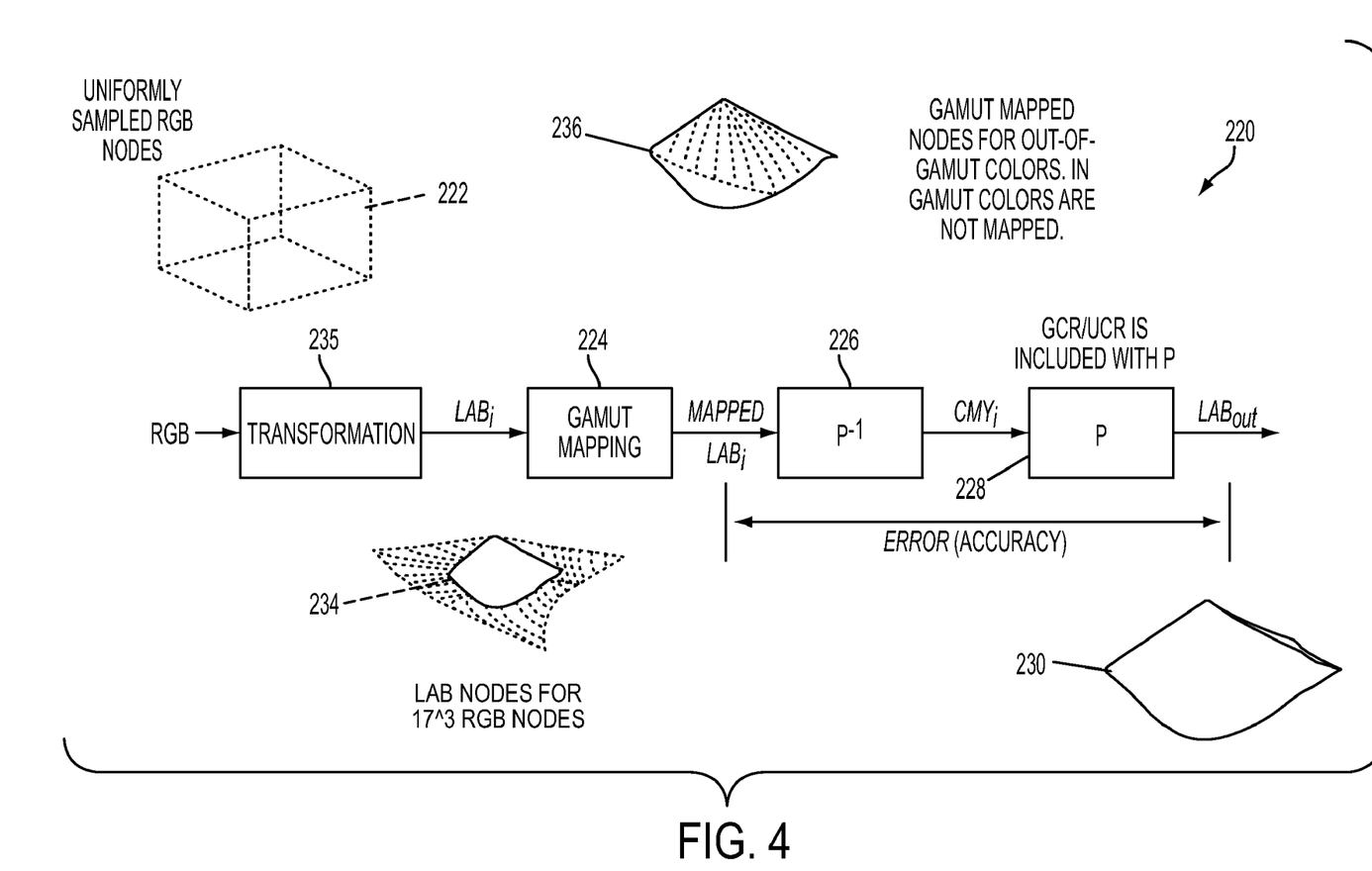
FIG. 4 is a block diagram of an image path according to an exemplary embodiment of this disclosure.

With reference to FIG. 4, characterization and construction of an image output device profile is illustrated.

According to this process, components of color profile LUTs are generated for an image output device such as a printer. The inverse printer model P 226 is a mapping from device independent color space L*a*b* to CMY device dependent space. The CMY values are optionally converted to CMYK using Gray Component Replacement or Under Color Removal (GCR/UCR) algorithms. For example, according to one exemplary embodiment of this disclosure, the GCR/UCR functions are embedded inside the printer, P 228. The inverse printer model $P^{-1}$ 226 is defined mathematically as $P^{-1}$: L*a*b*—>>CMY, where input L*a*b* points are on a 3-D grid of size N×N×N having a dynamic range of $0 \leq L < 0$; $-127 \leq a < 128$ and $-127 \leq b \leq 128$. For the ICC workflow (Reference: International Color Consortium Specification ICC.I:2004-10—Profile version 4.2.0.0 describing image technology, architecture, profile format and structure), these L*a*b* nodes can be generated using a uniformly/non-uniformly sampled RGB colors 222 for the range 0 to 255 each and applying suitable transformation 235 from RGB to L*a*b* 234 and mapping the out-of-gamut colors to the device boundary 236 using printer models. To express these nodes in profile connection space (PCS) of the ICC workflow, a conversion to L*a*b* or XYZ space is required. For this purpose, RGB color space is defined for RGB values between 0 to 255 and converted. For example, gen-RGB or AdobeRGB etc., are potential options used while constructing the multi-dimensional profile LUTs. There is correspondence between nodes in RGB space 222 to L*a*b*/XYZ values in Profile Connection Space. Also, there is correspondence between RGB nodes 222 to L*a*b* nodes 234 which are used to construct the printer inverse (i.e., L*a*b* to CMY).

The inverse printer function $P^{-1}$ 226 is obtained for a given printer drift state (called drift state 1) iteratively using spot color control methods and algorithms on each node which map each device-independent color Lab to the device dependent values CMY. This process is illustrated in FIG. 4 where the $Lab_i$ 234 inputs are mapped 224 within the gamut of the printing device. Subsequently, the mapped $Lab_i$ is transformed via the inverse printer model $P^{-1}$ 226 to produce $CMY_i$, and the device dependent $CMY_i$ is further processed by printer model P 228 to produce a $Lab_{out}$ 230 color space representation of the device dependent $CMY_i$ values. The $Lab_{out}$ 230 color space representation provides a means for comparison with the reference input $Lab_i$ to determine and control the accuracy of the inverse printer model $P^{-1}$ transformation. This process is performed in an iterative fashion to achieve the desired accuracy for each nodes, for example less than 3% error. Out of gamut L*a*b* values are mapped 224 to the nearest gamut boundary points to a region in the color space to produce a pleasing color using an appropriate gamut-mapping algorithm 236. By running the spot control algorithm for each node color (each node being defined as spot color), a LUT of size N×N×N from L*a*b*→CMY is produced, where the input L*a*b* is on a uniform grid or at desired points on the grid and the output CMY is unstructured. This inverse map is a necessary part of the profile algorithm.

The inverse printer function is repeated for various drift states, media and half tones. The data obtained from these steps are collected in a data matrix.

Figure 5:
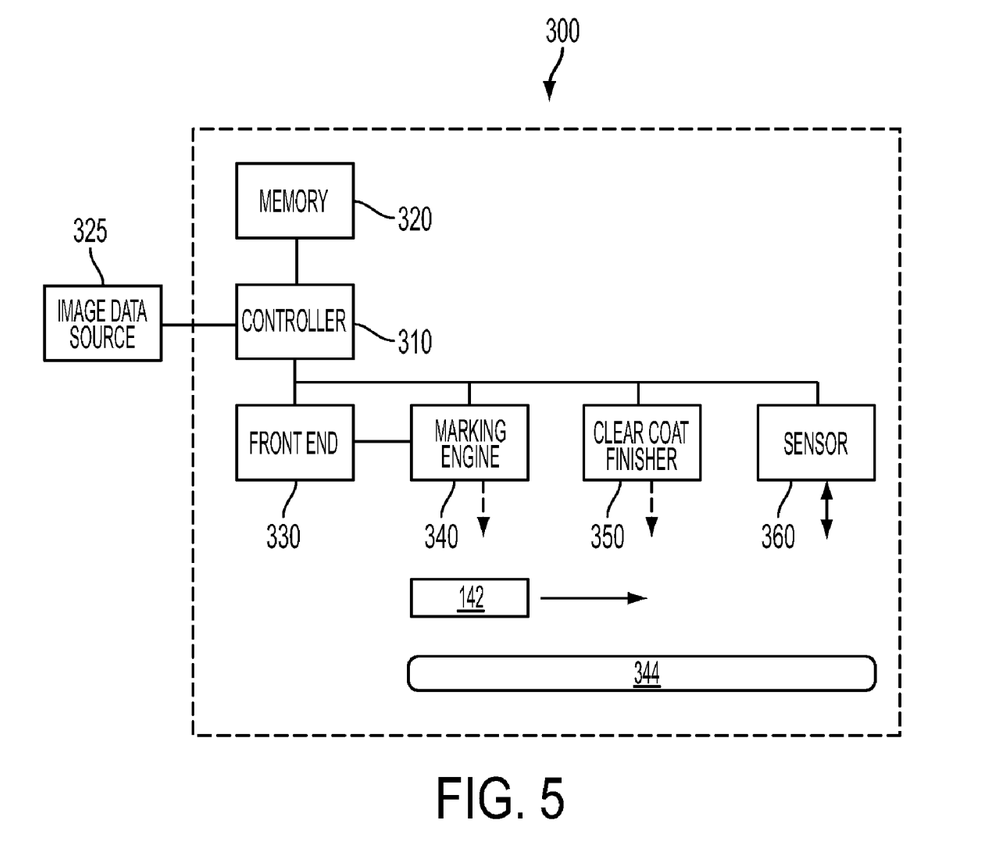
FIG. 5 is a block diagram of a printing apparatus according to an exemplary embodiment of this disclosure.

FIG. 5 is an illustration of an exemplary printing apparatus 300 according to this disclosure. The apparatus 300 includes an image output device, for example a printer, a multifunction media device, a xerographic machine, or any other device that can produce an image on media. The apparatus 300 also includes a controller 310 configured to control operations of the apparatus 300 and a memory 320 coupled to the controller 310, where the memory 320 includes reference color information corresponding to a desired color of an output image. For example, an output image can correspond to an image file including Red, Green, and Blue (RGB) color image information or including any other information useful for providing image information for outputting an image on media. The image file may be received from an image data source 325, for example a personal computer, an image workstation, a scanner, a network, a flash memory card, or any other source for image data. Information may include L*a*b* information or other reference color information corresponding to a desired color of an output image on media.

The apparatus 300 also includes a front end 330 configured to provide a marking engine control signal corresponding to the desired color of the output image. The controller 310 may be located within the front end 330 or the front end 330 may be located within the controller 310, or different functions of each may be located at different locations within the apparatus 300. The marking engine control signal may include cyan, magenta, yellow, and black (CMYK) information, can include hexachromatic information, or can include any other information useful for instructing a marking engine to output an image on media.

The apparatus 300 also includes a color marking engine 340 coupled to the front end 330, where the color marking engine 340 can be configured to generate an image on media 342 responsive to the marking engine control signal using image output settings. For example, the color marking engine 340 can generate an image on the media 342 as the media 342 is transported along a media transport 344. The media 342 can be a substrate, such as paper, a transparency, cardboard, or any other media. The color marking engine 340 also can be configured to generate an image having at least one test patch on the media 342 using the image output settings, where the at least one test patch can include a color of interest.

The apparatus 300 also includes a clear coat finisher 350 configured to coat the image on the media 342 with a clear coat to create a clear coated image on the media 342. The clear coat finisher 350 may be coupled to the controller 310. The clear coat finisher 350 can also change the perceived color of the image on the media 342 when coating the image on the media 342 with a clear coat. The clear coat can be an ultraviolet clear coat, an aqueous clear coat, or any other clear coat. For example, the clear coat finisher 350 can coat the output image on the media 342 with a clear coat finish by coating media including the output image with a liquid and curing the coated media using ultraviolet light to create a clear coated output image on media. The output image on the media 342 may be spot clear coated in selected areas to accent a particular portion of the media 342 or may be flood clear coated to cover all of the media 342. The clear coat finish can also be any other coating that can coat an image on media with a clear finish. For example, the clear coat finish can be a laminate clear coat finish that can be applied to an output image on the media 342 in a process separate from the apparatus 300 or in a process coupled to the apparatus 300.

The apparatus 300 also includes a sensor 360 configured to measure color attributes of the clear coated image and configured to provide color information of the clear coated image. The sensor 360 can be coupled to the controller 310. The sensor 360 can be a spectrophotometric sensor or any other image sensor configured to measure color attributes of the clear coated image to provide color information of the clear coated image. A spectrophotometric sensor can measure the wavelength of light reflected off the media 342. For example, a spectrophotometric sensor can measure light intensity as a function of the color of an image on the media 342. The color information of the clear coated image can include L*a*b* values. The controller 310 can be configured to determine a difference between the color information of the clear coated image and the reference color information and configured to adjust the image output settings according to the difference between the color information and the reference color information to achieve adjusted image output settings.

The apparatus 300 can iteratively perform a color control process until image output settings are optimal to produce the desired color of an image on media. For example, the color marking engine 340 can be configured to produce a next image on media using the adjusted image output settings. The clear coat finisher 350 can be configured to coat the next image on the media with a clear coat finish to create a clear coated next image on the media. The sensor 360 can be configured to measure color attributes of the clear coated next image to provide color information of the clear coated next image. The controller 310 can be configured to ascertain whether an optimal color has been achieved based on the color information of the clear coated next image, and configured to repeat, if an optimal color has not been achieved, determining a difference, adjusting image output settings, producing a next image, coating the next image, and measuring color attributes. The controller 310 can be configured to ascertain whether an optimal color has been achieved based on the difference between the color information of the clear coated next image and the reference color information being below a color error metric threshold.

If the desired color is outside of a gamut of colors achievable on a clear coated image produced by the color marking engine 340 and the clear coat finisher 350, the apparatus 300 can iteratively perform a color control process until image output settings are optimal to produce an optimal color of an image on media. For example, the controller 310 can be configured to ascertain whether desired colors of the clear coated image are outside of an image output gamut achievable by the image output settings of the apparatus 300. If the desired colors of the clear coated image are outside of the image output gamut achievable by the image output settings, the controller 310 can be configured to map, to the image output gamut of the apparatus 300, colors with a minimum color error metric between the desired colors of the clear coated output image and the image output gamut achievable by the image output settings.

The apparatus 300 can produce a final output image once adjusted image output settings are optimal. For example, the color marking engine 340 can be configured to produce a next image on media using the adjusted image output settings. The clear coat finisher 350 can be configured to coat the next image on the media with a clear coat finish to create a clear coated next image on the media. The sensor 360 can be configured to measure color attributes of the clear coated next image to provide color information of the clear coated next image. The controller 310 can be configured to determine adjusted image output settings are optimal based on the color information of the clear coated next image and configured to instruct the color marking engine 340 to produce a final output image on media based on the adjusted image output settings if the image output settings are optimal.

According to another related embodiment, the apparatus 300 can include a controller 310 configured to control operations of the apparatus 300. The apparatus 300 can include a memory 320 coupled to the controller, where the memory can include reference color information having L*a*b* information corresponding to a desired color of a desired output image on media. The apparatus 300 front end 330 may be configured to provide a marking engine control signal corresponding to the desired color of the desired output image. The apparatus 300 can include a color marking engine 340 coupled to the front end 330, where the color marking engine can be configured to generate an image on media 342 responsive to the marking engine control signal using image output settings. The color marking engine 340 can be configured to generate an image having at least one test patch on the media using the image output settings, the at least one test patch including a color of interest corresponding to the desired output image. The apparatus 300 can include an ultraviolet finisher 350 configured to coat the image on the media 342 with an ultraviolet coat to create an ultraviolet coated image on the media 342. The apparatus 300 can include a spectrophotometric sensor 360 configured to measure color attributes of the ultraviolet coated image and provide color information of the ultraviolet coated image based on the measured color attributes, where the color information of the ultraviolet coated image can include L*a*b* values. The controller 310 can be configured to determine a difference between the color information of the ultraviolet coated image and the reference color information. The controller 310 can be configured to adjust the image output settings according to the difference between the color information and the reference color information to achieve adjusted image output settings that create an ultraviolet coated image on the media that has color information closer to the reference color information. The color marking engine 340 can be configured to produce a next image on media using the adjusted image output settings.

The embodiments can be used with any device that can produce a color output image on media, such as a printer, a marking engine, a Tightly Integrated Parallel Printer (TIPP) machine, or any other device than can produce a color output image on media. For example, a TIPP machine can have many integrated marking engines that can operate together as a single printer. In some uses, one marking engine can produce an image on one side of media while another marking produces an image on the other side of the media. Each marking engine on a TIPP machine can be addressed by a front end that can iteratively adjust image output settings of the marking engines according to a difference between measured color information of a coated image and reference color information to achieve desired image output settings. If only one side of the media is clear coated, the corresponding marking engine can be adjusted accordingly. Thus, multiple marking engines in a single device can be consistent with each other even when clear coating is applied to part or all of one or more final output images on different portions of media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating a destination printer profile for coated images: comprising:
   A) receiving one or more target colors represented in a device independent color space;
   B) accessing an initial printer profile for the target colors printed with a coating, the initial printer profile transforming the device independent color space representations of the target colors to respective device specific recipes of colorants associated with printing and coating the target colors;
   C) printing one or more color patches using the initial printer profile to generate device specific recipes of colorants to print the color patches;
   D) coating the one or more color patches;
   E) measuring color attributes associated with the printed and coated color patches;
   F) determining an error associated with the printed and coated one or more color patches relative to the respective one or more target colors represented in a device independent color space; and
   G) modifying the initial printer profile for the target colors as a function of the error to generate a destination printer profile for printing the one or more target colors with a coating.

2. The method of claim 1, further comprising mapping coated target color outside of the printer gamut to in-gamut device independent color space.

3. The method of claim 1, wherein steps C), D), E), F) and G) are iteratively performed to converge the accuracy of the destination printer profile to render the one or more target colors.

4. The method of claim 3, wherein step A) receives one or more target colors associated with a plurality of nodes and step G) modifies the initial printer profile using a gain matrix which is a function of a printer model.

5. The method of claim 1, wherein the initial and destination printer profiles are multidimensional LUTs (look-up tables) which transform the device independent color space representations of the target colors to respective color recipes of colorants to print and coat the target colors with a printer associated with the destination printer profile.

6. The method of claim 5, wherein the device independent color space is one of RGB, Lab and XYZ, and the device dependent color space is one of CMY and CMYK.

7. A computer program product comprising:
   a non-transitory computer-usable data carrier storing instructions that, when executed by a computer, cause the computer to perform a method comprising:
   A) receiving one or more target colors represented in a device independent color space;
   B) accessing an initial printer profile for the target colors rendered with a coating, the initial printer profile transforming the device independent color space representation of the target colors to respective device specific color recipes of colorants associated with printing and coating of the target colors;
   C) printing one or more color patches using the initial printer profile to generate recipes of colorants to print the color patches;
   D) coating the one or more color patches;
   E) measuring color attributes associated with the printed color patches;
   F) determining an error associated with the coated one or more color patches relative to the respective one or more target colors represented in a device independent color space; and
   G) modifying the initial printer profile for the target colors as a function of the error to generate a destination printer profile for printing the one or more target colors with a coating.

8. The computer program product according to claim 7, the method further comprising mapping coated target colors outside of the printer gamut to in-gamut device independent color space.

9. The computer program product according to claim 7, wherein step A) receives one or more target colors associated with a plurality of nodes and step G) modifies the initial printer profile using a gain matrix which is a function of a printer model.

10. The computer program product according to claim 9, wherein step A) receives one or more target colors associated with a plurality of nodes and step G) modifies the initial printer profile using a gain matrix which is a function of a printer model.

11. The computer program product according to claim 7, wherein the initial and destination printer profiles are multi-dimensional LUTs (look-up tables) which transforms the device independent color space representations of the target colors to respective color recipes of colorants to print and coat the target colors with a printer associated with the initial and destination printer profiles.

12. The computer program product according to claim 11, wherein the device independent color space is one of RGB, Lab and XYZ, and the device dependent color space is one of CMY and CMYK.

13. A method of generating a destination printer profile for coated images comprising:
    A) receiving one or more target colors represented in a device independent color space;
    B) accessing an initial printer profile for the target colors printed with a coating, the initial printer profile transforming the device independent color space representation of the target colors to respective device specific recipes of colorants associated with printing and coating the target colors;
    C) accessing a printer model which associates a plurality of device specific recipes of coated colorants with respective device independent color space values;
    D) generating device independent color space representations for the one or more target colors coated using the initial printer profile and the printer model;
    E) determining an error associated with the generated device independent color space representations of step D) relative to the respective one or more target colors of step A) represented in a device independent color space; and
    F) modifying the initial printer profile for the target colors as a function of the error to generate the destination printer profile for printing the one or more target colors with a coating.

14. The method of claim 13, further comprising mapping coated target colors outside of the printer gamut to in-gamut device independent color space.

15. The method of claim 13, wherein steps C), D), E) and F) are iteratively performed to converge the accuracy of the destination printer profile to render the one or more target colors.

16. The method of claim 13, wherein step A) receives one or more target colors associated with a plurality of nodes and step F) modifies the initial printer profile using a gain matrix which is a function of the printer model.

17. The method of claim 13, wherein the initial and destination printer profiles are multidimensional LUTs which transform the device independent color space representations of the target colors to respective recipes of colorants to print and coat the target colors with a printer associated with the destination printer profile.

18. The method of claim 17, wherein the device independent color space is one of RGB, Lab and XYZ, and the device dependent color space is one of CMY and CMYK.

19. A computer program product comprising:
- a non-transitory computer-usable data carrier storing instructions that, when executed by a computer, cause the computer to perform a method comprising:
- A) receiving one or more target colors represented in a device independent color space;
- B) accessing an initial printer profile for the target colors printed with a coating, the initial printer profile transforming the device independent color space representation of the target colors to respective device specific recipes of colorants associated with printing and coating the target colors;
- C) accessing a printer model which associates a plurality of device specific recipes of coated colorants with respective device independent color space values;
- D) generating device independent color space representations for the one or more target colors coated using the initial printer profile and the printer model;
- E) determining an error associated with the generated device independent color space representations of step D) relative to the respective one or more target colors of step A) represented in a device independent color space; and
- F) modifying the initial printer profile for the target colors as a function of the error to generate the destination printer profile for printing the one or more target colors with a coating.

20. The computer program product according to claim 19, the method further comprising mapping coated target colors outside of the printer gamut to in-gamut device independent color space.

21. The computer program product according to claim 19, wherein steps C), D), E) and F) are iteratively performed to converge the accuracy of the destination printer profile to render the one or more target colors.

22. The computer program product according to claim 19, wherein step A) receives one or more target colors associated with a plurality of nodes and step F) modifies the initial printer profile using a gain matrix which is a function of the printer model.

23. The computer program product according to claim 19, wherein the initial and destination printer profiles are multidimensional LUTs which transform the device independent color space representations of the target colors to respective recipes of colorants to print and coat the target colors with a printer associated with the destination printer profile.

24. The computer program product according to claim 23, wherein the device independent color space is one of RGB, Lab and XYZ, and the device dependent color space is one of CMY and CMYK.

\* \* \* \* \*